Aug. 22, 1950 DE LOY J. WHITE 2,519,725

MAGNETIC REPRODUCER AND RECORDER UTILIZING ENDLESS RECORD AND AUTOMATIC SELECTING SYSTEM

Filed March 15, 1946 4 Sheets-Sheet 1

Inventor
DeLOY J. WHITE

By Westall & Westall

Attorneys

INVENTOR.
DeLOY J. WHITE
BY
*Westall & Westall*
ATTORNEYS

Inventor
DeLOY J. WHITE

By Westall & Westall

Attorneys

Aug. 22, 1950 DE LOY J. WHITE 2,519,725

MAGNETIC REPRODUCER AND RECORDER UTILIZING ENDLESS RECORD AND AUTOMATIC SELECTING SYSTEM

Filed March 15, 1946 4 Sheets-Sheet 4

Inventor

DeLOY J. WHITE

By Westall & Westall

Attorneys

Patented Aug. 22, 1950

2,519,725

UNITED STATES PATENT OFFICE 2,519,725

MAGNETIC REPRODUCER AND RECORDER UTILIZING ENDLESS RECORD AND AUTOMATIC SELECTING SYSTEM

De Loy J. White, North Hollywood, Calif.

Application March 15, 1946, Serial No. 654,560

2 Claims. (Cl. 179—100.2)

This invention relates generally to apparatus for magnetically recording and reproducing sound, and pertains more specifically to mechanism adapted for instantaneous reproduction of any of a plurality of individual sound records magnetically impressed upon steel tape or wire regardless of the station on the sound track at which the respective record is located.

The utility of steel tape and wire as a magnetic sound recording medium contemplates the movement of the tape or wire in effective magnetic association with pole pieces of a coil assembly energized by an electric current, the pulsations of which correspond in frequency, amplitude, and period with the sound waves to be recorded. As the reproduction of such a record requires generally the reversal of the recording process, a major problem in any commercial adaptation of such equipment is to provide effective means for carrying, directing and controlling the tape or wire, which, in order to achieve the desired definition in the transcription, must be quite long due to the speed of the medium past the pole pieces of the recording coil.

Heretofore, the tape or wire has been carried on spools or reels, being shifted from one to the other through the recording head. Reproduction of sound impressions as magnetically recorded thus necessitates the preliminary rewinding of the tape or wire to place the beginning of the sound track adjacent the reproducing coil. Correspondingly, transcription of any selected portion of the record requires the shifting of the tape or wire between the spools to an extent necessary to effect the operative juxtaposition of the selected portion to be reproduced, which is not easily identifiable, adjacent the transcribing head. While the tape or wire may be moved at a far greater rate of speed in the rewinding process, even a slight delay obviates the utility of prior art magnetic recording equipment in the applications to which the present invention is particularly well adapted.

Generally it is an object of the invention to provide a reproducing unit for magnetic records containing a series of unrelated sound impressions, embodying means by which the reproduction of any of the individual records may be initiated instantaneously or the entire group or any selected number thereof may be transcribed serially or in any sequence desired without any delay incident to rewinding of the tape or wire or otherwise, regardless of the order of the separate transcriptions upon the sound track or their individual or collective length.

Another object is to provide apparatus of the character above alluded to, adapted for utility in accomplishing split-second reproduction of a selected portion of long serially-recorded sound sequences, such as sound effects for radio productions and motion pictures, a plurality of musical numbers for commercial automatic music machines (known as "juke" boxes), or home recording and play-back machines and the like. For utility in "juke" boxes, magnetic recording equipment must be at least as responsive as present recording apparatus, whereas instantaneous response is required to make any such sound equipment practical for transcribing "sound effects."

It is, accordingly, another object hereof to provide a selector switch by which reproduction of any predetermined portion of the sound track may be effected incident to closing one of a plurality of circuits identified with the different portions of the sound track, the composite switch being adapted to coordinate the movement of the tape or wire with an electrical control and indicator mechanism whereby the transcription of a predetermined series of recorded sound impulses may be accomplished incident to actuation of a single control regardless of the position of the record to be transcribed on the tape or wire.

More specifically, an object hereof is a provision of a magnetic recording and reproducing unit embodying a plurality of magnetic heads arranged in spaced relationship along an endless recording medium of steel tape or wire, the distance along the sound track between respective pairs of magnetic heads being determined by the length of each of the serially impressed separate sound records carried by the track, whereby one of the magnetic heads may be located at the beginning of each sound record immediately prior to and at the conclusion of each transcription, for selective energization in response to actuation of mechanism operable to activate the magnetic head adjacent which the recording selected for transcription is located.

Still another object is to provide a compound tension device and cut-out switch adapted for engagement with each convolution of the endless sound recording medium so as to maintain the latter under constant tension and thereby avoid vibration or "whipping" of the tape or wire as it travels between its carriers or between the pole pieces of the respective magnetic heads, and further functions to open the circuits to the energized recording head and the tape or wire drive mechanism in the event of fracture of the recording medium.

Another object is the provision, in apparatus of the character last above alluded to, of locking means to engage and hold each convolution of the tape or wire against movement in the event of fracture so as to obviate disturbance of the prearranged distribution of the recording medium upon the carrier elements and through the respective recording heads incident to its normal tendency to coil when tension is relieved.

Still another object is the prevision of guide means comprising a plurality of spacing elements to assure uniformity in the direction of travel of the individual reaches of the tape or wire during recordation of a magnetic pattern thereon, or reproduction or erasure thereof.

Numerous other objects and salient features of my invention, such for example as simplicity of operation, facility of repair and replacement of worn or damaged parts, relative economy of manufacture, and maximum selectivity, will be apparent to those of skill in the art upon an examination of the following description read in the light of the accompanying drawings, in which.

Figure 1:
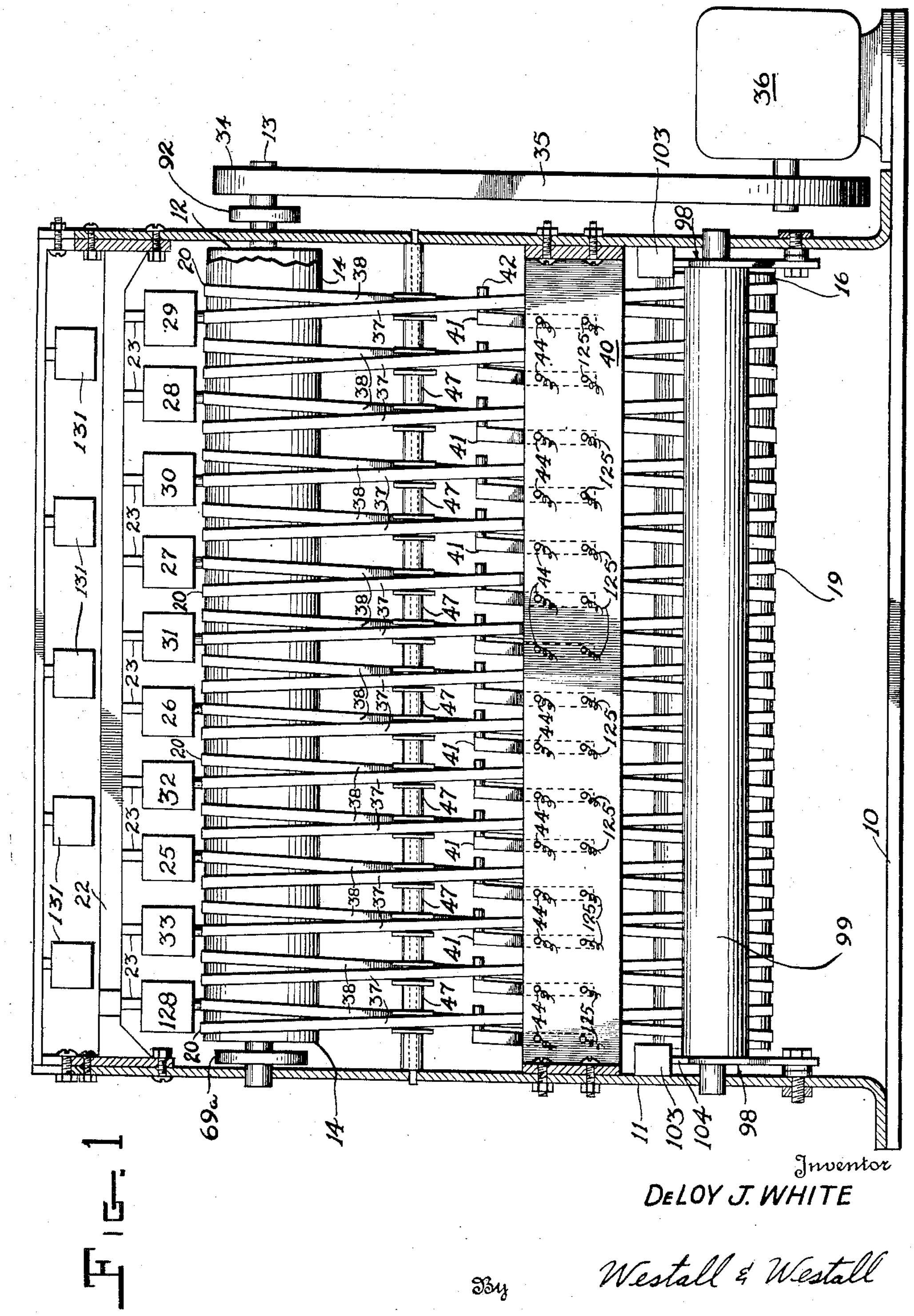
Fig. 1 is an end elevation of the assembly, showing particularly the crossing of adjacent convolutions of the tape, which occurs at each end of the unit, and the multiple reproducing head assembly.

The unit consists generally of a plurality of drums arranged horizontally in parallel relationship over which a long endless steel tape or wire is carried. In the embodiment illustrated, tape is utilized as the recording medium, but it will be understood that wire may be substituted in modifications hereof. The tape is carried upon the drums in thirty complete convolutions, fifteen serially connected convolutions being arranged spirally upon the drums to move, incident to actuation of the drive mechanism, progressively toward one end of the machine with the remaining half of the tape progressing toward the other end of the drum assembly, in a manner hereinafter more fully described. Two of the drums are journalled in a common plane to support, horizontally, a reach of each convolution of the tape. Superimposed across the horizontal sections of the tape is a multiple magnetic recording, reproducing and erasing head, comprising a separate coil assembly for each third horizontal section of the tape. Also included in the assembly is a composite tension and an electrical cut-out switch mechanism adapted to engage and maintain the convolutions under uniform tension and operable further, upon fracture of the tape, to coincidentally open the circuit to the drive mechanism and actuate a structurally-separate brake and tape-holding means so as to stop the operation and lock the broken tape firmly in position.

As a structurally-separate unit, the invention includes a composite selector switch electrically connected with the multiple recording head assembly, which includes mechanism to continuously and automatically coordinate each of a plurality of separate manually-actuated switches, identified with different respective recorded portions of the sound track, with the reproducing coils adjacent which the respective sections of the sound track are disposed when the machine is at rest, regardless of the continuously-changing location of said individual records on the tape with respect to the various coils.

Referring now more particularly to the drawings, the numerals of which indicate similar parts throughout the several views, 10 designates a suitable base member upon which the apparatus is mounted. A pair of side frame plates 11 are rigidly secured to the base member 10 so as to extend vertically in spaced relation for the support of the principal elements of the unit, above alluded to, therebetween.

Interposed between plates 11 is a drive drum 12 having coaxial pins 13 extending from opposite ends which project through and are journalled in horizontally-aligned holes adjacent the top and at corresponding ends of plates 11. A second drum 14 (see Fig. 2), preferably of the same diameter, is similarly journalled between plates 11 in parallel relationship with the drive drum 12, but at the opposite end of the supporting frame.

Directly below each of drums 12 and 14, additional drums 15 and 16 are similarly journalled between the supporting frame plates 11, and intermediate the vertical aligned pairs of drums, five other drums 17 are provided, mounted upon coaxial pins 18, rotatably held in the opposed supporting plates, and which are alternately staggered to utilize to best advantage, in the interest of large tape capacity, the space between the rectangle defined by the four rollers 12, 14, 15 and 16. As hereinabove indicated, the recording medium comprises an endless steel tape 19, which is wound around the drums thirty times so as to form thirty convolutions thereof, with each convolution engaged with and supported by all of the drums. To this end the length of tape 19 at one end of the drive drum 12 extends downwardly under drum 15 therebelow, and then under and over the staggered drums 17 and thence under drum 16 and over drum 14, returning in a horizontal reach 20 to the drive drum 12 at a point adjacent but spaced from the beginning of the first convolution thereof. The fourteen succeeding convolutions of the tape are correspondingly wound around the tape carriers in a spiral, terminating at the opposite end of the drum assembly in the fifteenth convolution. The reach 21 of the sixteenth convolution between the drive drum 12 and drum 15 crosses the corresponding section of the immediately preceding convolution, thus initiating the reverse spiral progression of the tape through successive convolutions toward the opposite end of the roller assembly. Accordingly, it will be observed that one-half of tape 19 is spiralled toward one end of the frame and the other half correspondingly spiralled in a reverse direction with sections of each convolution of the latter half of the tape overlapping sections of each of the first fifteen convolutions comprising the first spiral at each end of the unit as indicated in Fig. 1.

The embodiment of my invention illustrated and herein particularly described is adapted to accommodate a sound track containing ten separate magnetic records of equal length which are serially impressed upon the tape. As there are thirty convolutions of tape carried by the drums, the multiple recording head assembly, about to be described, is arranged to support one reproducing coil and pole piece assembly in operative contact with each third convolution. To this end I provide a bar 22 composed of non-magnetic material, having its ends connected to the opposed frame plates 11 so as to extend transversely across the upper horizontally-disposed reaches 20 of the tape intermediate the drive drum 12 and drum 14. Depending from bar 22 are a series of coil cores 23 arranged in equi-spaced relation to overhang and contact the horizontal reaches 20, respectively, of each third convolution of the tape. Around each core 23 a coil of conventional construction is wound, whereby energization of the coil by a sound current is effective to polarize the end of the core in contact with the tape. The coils are identified by numerals 24 to 33. The opposite pole of each coil is shown diagrammatically in Fig. 2 below the tape as at 23*a*, it being understood that in accordance with conventional construction each pole 23*a* of the corresponding coil is connected with the upper end of core 23 around the tape so as to be of opposite polarity and attract the magnetic flux emanating from the lower end of the adjacent core 23.

Figure 2:
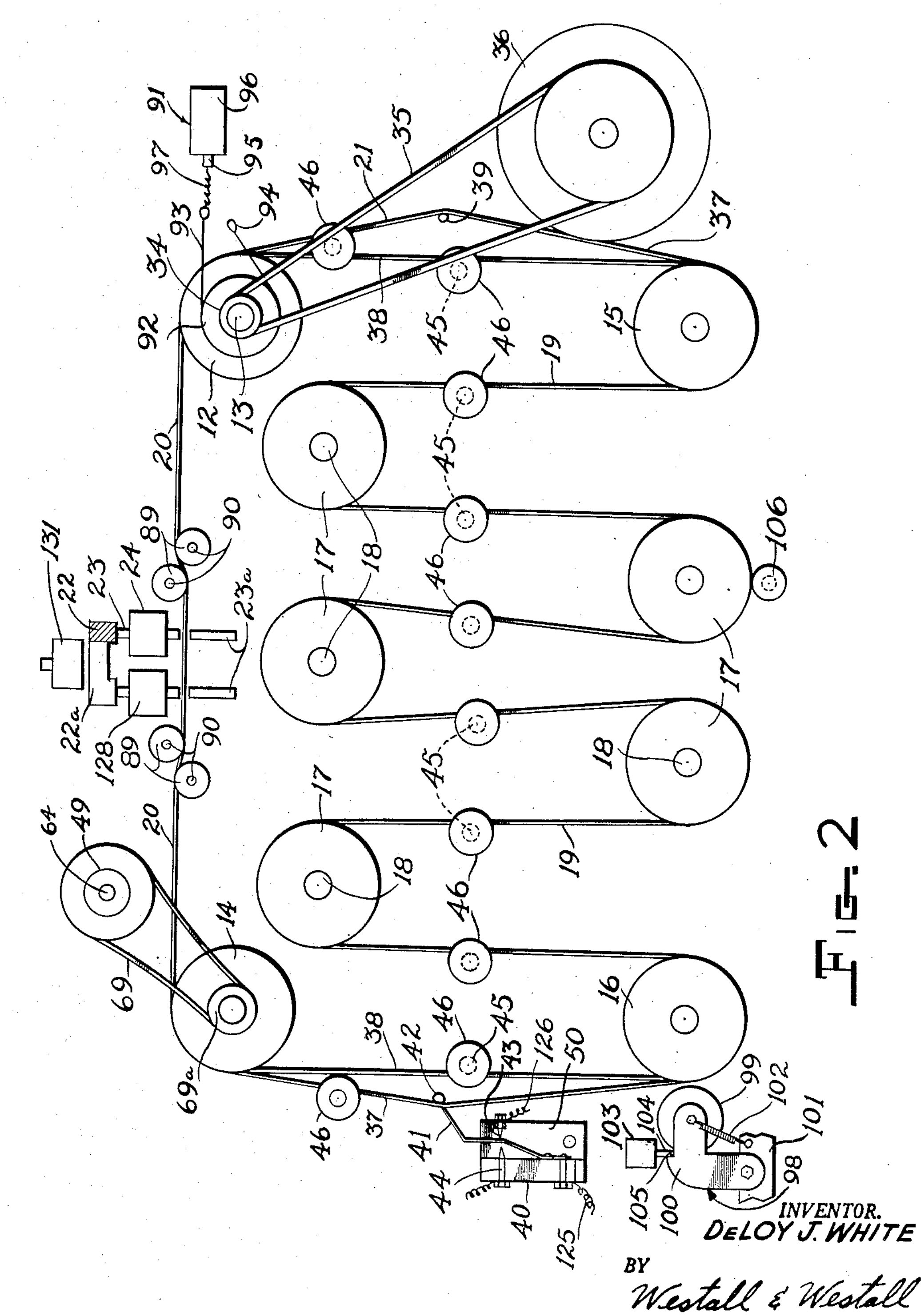
Fig. 2 is a side elevation of the unit, but omitting the side supporting plates, and depicting the relative arrangement of the recording, transcribing and erasing coil assemblies, timer mechanism, tape-tension device, and the dual brake assembly, and showing further the drive and carrying means for the tape.

One of the pins 13 of drive drum 12 projects through one of the frame plates 11 and has mounted thereon a pulley 34 over which a belt 35 extends for transmission of rotary motion from a suitably located electric motor 36. Actuation of motor 36 is thus effective to drive the tape 19 over the various drums at high speed, the direction of movement of the upper horizontal reaches of the tape being from left to right as seen in Fig. 2. It will be noted, however, that alternate reaches of the tape overlying the drive drums and which are inclined, parallel to one another, in one direction (Fig. 1) comprise one-half of the tape and are serially connected, while those reaches inclined in the opposite direction and comprising the other half of the tape are correspondingly connected in series. The two differently spiralled halves of the tape are connected at the ends of the tape-carrying drums.

Thus, at each end of the apparatus the convolutions 37 composed of one-half of the tape which are spiralled in one direction overlap convolutions 38 comprising the other half of the tape spiralled in the opposite direction. To avoid friction between the overlapping reaches of tape 19, I provide at one end of the assembly (see Fig. 2) a rod 39 having its ends rigidly mounted in the frame plates 11 and extending between the outer overlapping reaches of each of the convolutions 37 of tape 19 and the inner lapped reaches 38, so as to prevent any contact between these sections of the tape.

At the opposite end of the unit a bar 40 composed of dielectric material having its ends secured to the side frame plates 11 extends across the lapped and overlapped reaches 38 and 37, respectively, of the tape intermediate the drum 14 and the drum 16 therebelow. A plurality of phosphor bronze spring members 41 (fifteen in the embodiment illustrated) of a composite tensioning device and cut-out switch 50, are each secured at one lower end to bar 40 in equi-spaced relationship in positions slightly offset respectively from the overlapping sections of convolutions 37 at that end of the assembly. The upper end of each member 41 extends toward the adjacent reach of the tape and carries a short laterally-projecting rod 42 that engages behind the overlapping reach of the tape adjacent which it is disposed. Each spring 41 normally exerts a lateral tension upon the tape to hold it out of contact with the vertically-disposed lapped reach of the convolution 38 of tape thereunder.

The tape 19 is sufficiently taut to extend each of the springs 41 into contact with an adjacent terminal 43 suitably supported at the opposite side of each spring 41 from bar 40, which with the springs are arranged in the circuit to the drive motor 36, as will appear. It will be appreciated that if any convolution of the tape breaks, the tension of that convolution will be immediately relieved, whereupon the spring 41 engaged therewith will snap out of contact with the terminal 43 opening the circuit to motor 36. The assumption of the more-nearly normal position of such spring 41 engaged with the broken convolution of the tape thereupon causes its upper end to contact a terminal 44 carried by the bar 40 and completes a circuit through actuating mechanism for a tape-locking device and an independent roller brake, about to be described.

It will be observed that the function of the rod 39 and of the various springs 41 are complementary to one another as they tend under normal conditions to equalize not only the length of the convolutions with respect to one another but also cooperate in maintaining the tension throughout the length of the tape substantially uniform.

The double spiralled arrangement of tape 19 is maintained during operation by a plurality of guide assemblies, one of which is arranged to engage all of the vertical reaches of the tape, leaving drum 12. The other guide assemblies similarly engage, respectively, other vertical reaches of the tape, moving from each of drums 15, 16 and 17, respectively. Additional guides maintain the proper angular disposition of the reaches of the tape extending obliquely outward from the drive drum 12 and drum 16, respectively. The guide assemblies are substantially identical in construction, and it will be understood that the following description of one thereof applies also to each of the others. Each composite guide comprises a rod 45 having its ends secured in opposite frame plates 11 so as to extend therebetween in parallel alignment with the drums. A plurality of disks 46, equal in number to twice the total number of convolutions of tape 19, are arranged on rod 45 in pairs, the disks 46 of each pair being spaced apart a distance equal to the width of tape 19 by spacers (not shown) so as to engage opposite side edges of the length of tape in alignment with which they are disposed, respectively. The different pairs of disks are accordingly spaced apart by sleeves 47 encircling the rod 45. Sleeves 47 are each of a length corresponding to the proper equal spacing between the reaches of the tape extending thereover. Inasmuch as two guide assemblies are provided for the lapped and the overlapping reaches of the tape extending from drums 12 and 16 at respective ends of the unit, it will be appreciated that sleeves 47 of these end guide assemblies are twice as long as those provided for the tape extending toward and leaving the intermediate drums 17.

Each of the reproducing coils 24 to 33, inclusive, is adapted for connection with an amplifier 48 (Fig. 5) and loud speaker (not shown) for audible reproduction of the sound record carried by the tape moving in effective magnetic proximity therewith in a manner hereinafter more in detail described. A record carried by the three convolutions of tape in position for audible reproduction by coil 24 is that which is located at the left end of the unit between coils 33 and 24 while the record in position for transcription by coil 25 is that impressed upon the length of tape extending between coils 24 and 25. Alternate coils are in contact with serially connected portions of the tape except at each end of the tape carrying drums, where the tape reverses itself between adjacent coils 28 and 29 and coils 33 and 24, respectively. It will be appreciated that upon transcription of any one of the records all records will have advanced to a position immediately preceding the next serially arranged coil. E. g., as the first record above alluded to upon the tape between coils 33 and 24 is transcribed, that length of tape will have progressed to a point intermediate coils 24 and 25, and all other records will have been advanced to a corresponding extent. Accordingly, each transcription (of any of the records) results in the juxtaposition of all records adjacent the next succeeding coils.

Figures 3, 4:
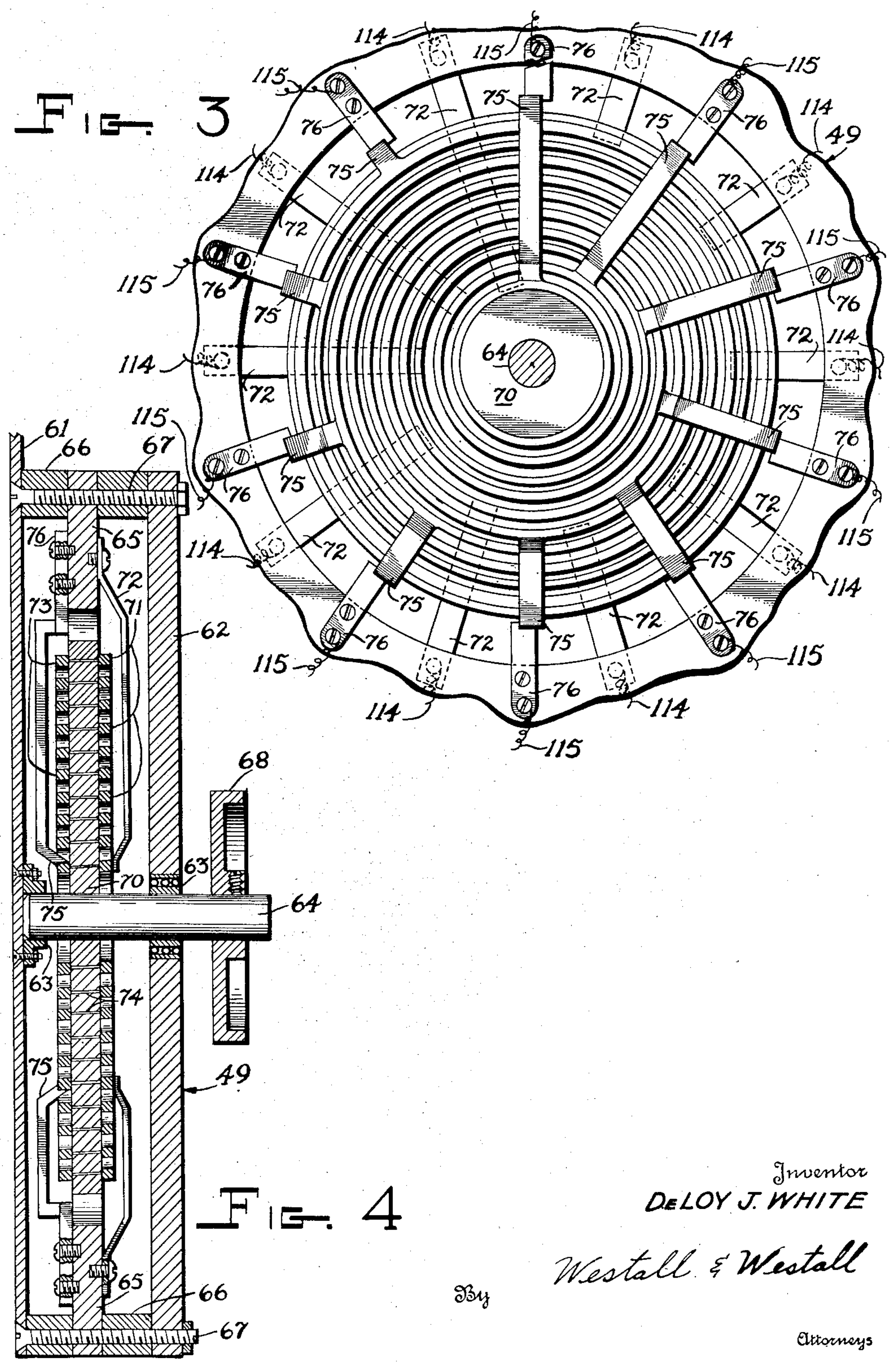
Fig. 3 is a plan view of the selector switch with the outer casing removed.
Fig. 4 is a sectional view taken on line 4—4 of Fig. 3.
Figure 5:
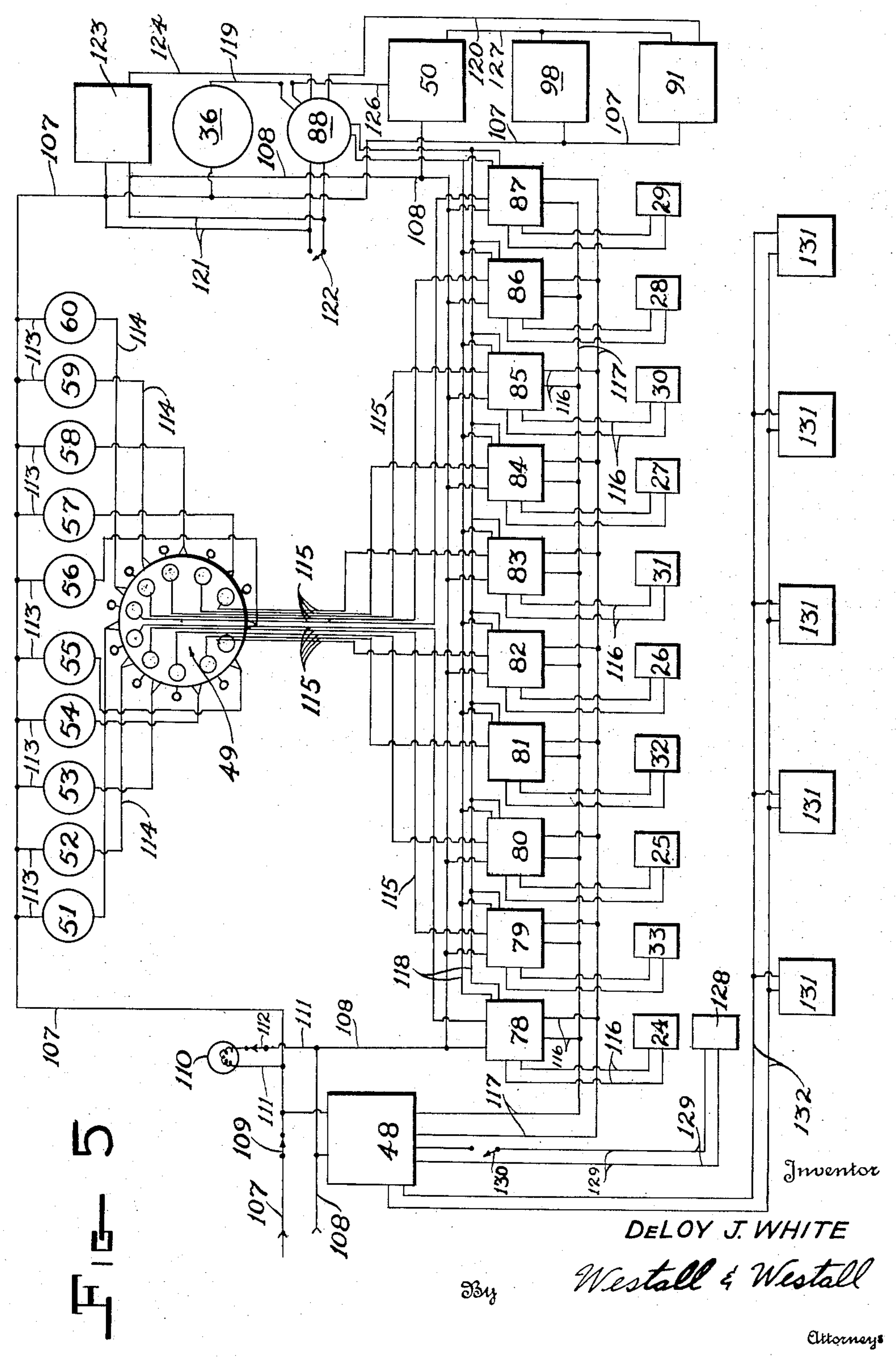
Fig. 5 is a wiring diagram of the apparatus.

In order to enable the selective actuation of the coils for the reproduction of any of the records carried by the tape or any group thereof in any sequence desired by the operator, I provide a compound rotary selector switch assembly 49 which is effective to coordinate automatically the individual operations of any of a series of manually-controlled switches illustrated diagrammatically in Fig. 5 and identified by the numerals 51 to 60, with the energization of the reproducing coils that are momentarily positioned at the beginning of the records by which said respective switches 51 to 60 are permanently identified. Switch 49 illustrated most clearly in Figs. 3 and 4 comprises a casing consisting of plates 61 and 62 supporting coaxially aligned bearings 63 for the support of a shaft 64, adapted to be rotated in synchronization with the operation of the tape-carrying drums, as will appear. Between plates 61 and 62, a flat annulus 65, composed of a suitable dielectric, is held in a central plane equi-distant from the respective plates 61 and 62 by interposed spacers 66, through which elements bolts 67 extend to hold the assembly together. One end of shaft 64 projecting from the casing carries a pulley 68 to which power is transmitted from the drum 14 through a belt 69, pulley 69a and an interposed speed reducer (not shown) whereby shaft 64 is compelled to complete a single revolution with each complete cycle of movement of the entire tape, i. e., with each movement of the tape through all ten reproducing coil assemblies 24 to 33. It will be understood that the means shown and described for operating and synchronizing switch 49 with the movement of tape 19 is merely illustrative of any conventional apparatus, and that the switch 49 may be actuated directly from motor 36 through suitable reduction gearing, or a separate motor may be employed for this purpose, and that the essential synchronization of the movement of the switch shaft 64 and tape 19 may be accomplished electrically if desired.

Mounted upon the shaft within the casing is a flat disk 70 composed of a dielectric material, to one side of which are secured by suitable means ten concentric brass rings 71. The annulus 65 is of a width sufficient to project into the casing and afford support for ten resilient spring contacts 72 which are equi-spaced around the axis of shaft 64. The spring contacts 72 are each of different lengths, to slidably engage and maintain contact with different rings 71. At the opposite side of disk 70 a second group of ten concentric brass rings 73 are secured in transverse alignment with the rings 71 to which they are connected respectively by pins 74 extending through disk 70. Each of rings 73 is provided with an integral radial extension 75, varying in length in inversed proportion to the difference in spacing of the respective rings 73 of which they are a part from the axis of the assembly whereby the outer ends of the extensions all terminate slightly beyond the periphery of disk 70. Secured to the corresponding side of annulus 65 and projecting radially inward into the arc of movement of the outer ends of extensions 75 are ten terminals 76 arranged around shaft 64 in equi-spaced relation whereby the spring contacts 72 and terminals 76 are alternately disposed. Rotation of shaft 64 results in maintaining electrical communication through the rings 71 and 73 between the springs 72 and the radial extensions 75, which latter, with each record transcription, are shifted circumferentially into electrical contact with the next suceeding terminals 76. Each terminal 76 is connected with an individual conventional solenoid-controlled relay mechanism as hereinafter described (see Fig. 5), to complete an auxiliary circuit through a reproducing coil for a period determined by a conventional timer, as is hereinafter described more in detail. The relays are identified by numerals 78 to 87.

It will be understood that the manually-actuated switches 51 to 60 may be arranged in a panel (not shown) adapted to support indicia designating the separate magnetic records carried serially on the tape. While the location of the record along the length of the tape with respect to the various reproducing coils varies with each transcription, and while this factor is compensated for by the selector switch 49, it is essential that the succession of the magnetic records on the tape be in accordance with the arrangement of switches 51 to 60 identified therewith, respectively, on the panel in order to assure the selectivity required, as will be obvious. Thus, as each terminal 76 is identified with a particular reproducing coil, it is necessary that the compound switch 49 be preliminarily adjusted to position the respective ring extensions 75 in contact with terminals 76 for energization of the coils adjacent which the records on the tape, corresponding to the respective switches, are located. For example, if the record intended to be reproduced by closing switch 51 is initially placed between coils 33 and 24, reproducing coil 24 must be connected with the amplifier 48 in order to effect the reproduction of that record. This requires that the compound selector switch 49 be preliminarily adjusted to engage the ring extension 75, connected with switch 51, through the rings 71 and 73 and spring contact 72, with the terminal 76 that is operable to close the circuit through coil 24 and the amplifier 48. Such arrangement of the switch 49 automatically positions the other extensions 75 of rings 73 connected to respective switches 52 to 60 in contact with the relays 79 to 87 that control the connection between the other reproducing coils 25 to 33 and the amplifier 48. The closing of switch 51 thereupon momentarily completes a circuit through selector switch 49 and the relay 78 whereupon coincident movement of the entire tape under the corresponding reproducing coil 24 is effective to audibly reproduce the sound corresponding to the magnetic pattern of the first record through the amplifier and loud speaker assembly (Fig. 5). At the conclusion of the first transcription the circuit through the first coil 24 is then broken by a timer 88 that is arranged in and controls the circuits through each reproducing coil and the amplifier.

The transcription of a single record will have resulted in the advancement of each record to a position with its beginning juxtaposed adjacent the next reproducing coil, and coincidentally the ten ring extensions 75 will have been moved into contact with the corresponding terminals 76 of the selector switch 49. The apparatus is therefore automatically set for reactivation. The same first record may again be reproduced by closing the same switch 51 with which that record is identified. However, due to the shifting of the selector switch 49 the circuit will be completed through the second terminal 76 and the second coil 25 adjacent which the first record is at that moment located. In this manner the selector switch continues through successive operation to coordinate the operation of the respective switches with the shifting of the magnetic records carried by the tape relative to the several coils.

As hereinabove indicated, each third convolution of tape 19 passes, during operation, between the opposed pole pieces of a reproducing coil at very high speed. This requires that additional support be provided for the tape at each side of each coil assembly. To this end I provide a pair of elongated stabilizing rollers 89 at each side of points of contact by the pole pieces, the rollers 89 of each pair being disposed at opposite sides of the tape and offset slightly in the direction in which the tape extends. Rollers 89 are rotatably supported by coaxial trunnions 90 journalled in the opposite side frame plates 11. The pair of stabilizing rollers 89 disposed above tape 19 are offset inwardly from the rollers below the tape, and the lower arcs of their peripheries extend below the upper surface of the complementary rollers so as to maintain tension upon the section of each convolution of tape engaged by the pole pieces of the respective coils. In this manner, each horizontal reach of tape is supported in a fixed plane so as to minimize wear upon the pole pieces 23 and 23*a*. Another advantage of the stabilizing rollers 89 is that, incident to their friction upon the tape, substantially all slack is obviated in the horizontal reaches 20 thereof, which, upon application of power to the drive roller 12, might otherwise result in snapping the very frangible tape.

As hereinabove indicated, one of the features of the present equipment is the speed with which the apparatus responds to the actuation of the various switches 51 to 60. In order to maintain this advantage during successive operations, and further to assure the continuance of the initial identity of the records transcribed with the respective switches 51 to 60, it is essential that the movement of the tape be stopped promptly after each reproduction, with the beginning of all magnetic records juxtaposed adjacent the coil assemblies, respectively, by which such records may be selectively reproduced during the next succeeding operation of the apparatus. To this end I provide brake mechanism, indicated generally by the numeral 91, for the drive drum 12 comprising a pulley 92 mounted on pin 13 projecting from one end of drive drum 12 for operative engagement by a band 93 having one end secured to a suitable stationary support 94 laterally of pulley 92. The opposite end of band 93 is secured to the core 95 of a solenoid 96 by a helical spring 97. Solenoid 96 is adapted to retract core 95 upon energization so as to resiliently tension band 93 through the spring 97 and apply sufficient friction upon the pulley 92 to immediately stop the drive drum 12 and tape.

Tape or wire of the type adapted for use in magnetic recording is exceedingly thin, frangible, and resilient. In an embodiment such as that illustrated, capable of carrying a total magnetic record for a thirty minute transcription, approximately 4,200 feet of tape are employed. Should the tape break, the entire length thereof tends to leave the drums and guide assemblies, and become tangled, making a difficult task of rearrangement and repair. To largely obviate this result from a fracture of the tape, I provide a tape-locking device 98 comprising a roller 99 journalled between brackets 100, pivoted to suitable frame supports 101, with roller 99 disposed adjacent and parallel to but laterally of the lower drum 16, whereby the roller 99 may be swung against the adjacent tape-carrying drum and upon the convolutions of tape passing thereover. A helical spring 102 interposed between the end of each bracket 100 in which the roller 99 is journalled and the adjacent frame support 101 tends to urge the roller into contact with the tape on drum 16. Adjacent each end of roller 99 a solenoid 103 is mounted, having a core 104 extended into engagement with a recess 105 in the adjacent bracket 100 to normally hold the roller 99 in inoperative spaced relation with respect to the adjacent tape-carrying drum 16 in opposition to the urge of the spring 102.

An idler roller 106, journalled between the side frame plates 11, is positioned to rotate against the tape overlying one of the tape-carrying drums 17 to further resist displacement of the tape in the event of breakage. Additional idlers (not shown) may be arranged in contiguous relation with other of the tape-carrying drums if desired, and will be obvious.

With particular reference to the wiring diagram of Fig. 5, the operation of the present embodiment of my invention is briefly described as follows: Power for the unit is supplied through a lead 107, and 108 in one of which a manually-operable switch 109 is located adapted to be opened while servicing the equipment. Across the leads 107 and 108 a lamp 110 is connected by wires 111 to illuminate the interior of the cabinet (not shown) in which the apparatus is carried, when switch 109 is closed. An auxiliary switch 112 in one branch wire 111 controls the circuit through lamp 110.

With tape 19 arranged for immediate transcription of any of the magnetic records impressed thereon by the reproducing coils, the operator first selects the particular record he wishes to hear from the indicia accompanying the respective switches 51 to 60. Each of these switches is connected to the source of power by leads 113 connected to wire 107, and with the selector switch 49 by leads 114 whereupon closing of any thereof is effective to pass a current through the spring contact and ring extension 75 corresponding therewith to the terminal 76 with which the latter is engaged, and thence to the solenoid of the relay corresponding to the reproducing coil which is juxtaposed at the beginning of the magnetic record to be reproduced through wires 115. The solenoid of the relay is operable to connect the reproducing coil with which it is associated with the amplifier 48 through leads 116 and wires 117. Upon actuation of any one of the relays 78 to 87, the circuit 118 through the timer 88 is closed, initiating the operation of the timer which is effective to close an auxiliary circuit 119 through the drive motor 36 one terminal of which is connected to lead 107, and thereby start the movement of the tape in contact with which the pole pieces 23 and 23*a* of the particular reproducing coil, brought into electrical communication with the amplifier, are engaged.

Simultaneously, the timer 88 opens the circuit 120, normally closed, to the brake solenoid 96 connected to lead 107 so as to relieve the friction of the brake band 93 upon the pulley 92 of the drive drum 12. The timer switch 88 in the embodiment illustrated is adjusted to open circuit 119 through motor 36 and close the circuit 120 to the brake mechanism 91 at the end of a three minute interval, which is the time required for the reproduction of each recording. A shunt circuit 121 around the switch of the timer 88, controlled by an external manually-actuated switch 122, is provided whereby closing of this switch renders the timer mechanism inoperative. In this manner the entire magnetic record or any extended portion thereof carried by the whole tape may be reproduced without interruption. A complete magnetic pattern is initially impressed upon the tape by energizing any one of the coils, incident to closing one of switches 51 to 60, through amplifier 48 by a sound current and passing the entire length of tape 19 or the portion thereof to be used as a sound track in contact with the pole pieces of the energized coil. The switch 122 last referred to is maintained in closed position during this operation in order to permit uninterrupted movement of the tape.

The coin-operated switch 123 is arranged in an auxiliary circuit with timer 88 through leads 124 and 107 and in accordance with conventional construction, is operative to neutralize the timer as long as a coin is in the switch. Accordingly, in embodiments utilizing the coin-operated switch the timer will not open the circuit to the motor 36, and will not activate the brake mechanism 91 so long as the coin remains in the switch. Thus, several coins may be placed simultaneously within the switch, and the machine will successively reproduce the records selected by actuation of the switches 51 to 60 until all of such records, equal in number to the number of coins inserted into the coin-operated switch 123, have been audibly reproduced. When the last of the series of coins passes through switch 123, the timer 88 is again cut into the circuit so as to stop motor 36 and actuate the brake 91 at the conclusion of the following three minute period initiated by the last coin.

The terminal 43 and spring member 41 of each tension switch 50 are connected in series with one another and with the switch mechanism of the timer 88 through leads 125 and 126. If any convolution of the tape is broken, the tension of the tape upon the spring member 41 nearest adjacent the break is relieved, breaking contact between the spring 41 and terminal 43 and opening the circuit through the timer 88 to the motor so as to stop the latter. The relief of tension upon any of the spring members 41 also permits the spring to contact terminal 44, completing the circuit through the solenoid 96 of the brake mechanism 91 and also to each of the solenoids 103 of the tape-locking devices 98 through leads 126 and 127. Energization of the latter solenoids is effective to release the rollers 99 which, in response to tension of the springs 102, are swung firmly against the adjacent tape-carrying drum 16 to hold the tape in position until repairs can be effected.

128 indicates an erasing coil and pole piece assembly suspended from lateral extension 22*a* of bar 22 adjacent reproducing coil 24. The erasing coil 128 is connected through amplifier 48 to the main leads 107 and 108 by circuit 129, through which coil 128 may be energized to delete a previously recorded sound pattern from the tape in a conventional manner. This circuit, controlled by a manually-actuated switch 130, is normally open so as not to interfere with reproduction of the records by any of the reproducing coils. The tape may also be polarized or magnetically conditioned by coil 128 in accordance with usual practice to permit the impression of a subsequent series of magnetic records adapted for most effective audible reproduction.

It will be noted that an old series of magnetic impressions carried by the tape may be erased and a new record impressed thereon simultaneously by one of coils 24 to 33.

A series of "hum-bucking" coils 131 connected in a separate circuit 142 through amplifier 48 and arranged in close proximity with the reproducing coils 24 to 33 produce magnetic fields in opposition to those of the reproducing coils so as to confine, by opposing, the fields of the latter coils, and to obviate the objectional effects of variations in the magnetic field intensity in and around the recording and reproducing coils.

While I have described but one embodiment of my invention adapted to accommodate a quantity of tape sufficient for approximately thirty minutes of continuous transcription, it will be understood that numerous changes in size, design, shape and number of the various parts may be made, and particularly the arrangement and number of the tape-carrying rollers may be altered in accordance with specific requirements, without departing from the spirit of my invention as defined in the appended claims. In the embodiment illustrated and above described all magnetic records are impressed upon and reproduced from a single tape. It will be appreciated that a plurality of separate recording mediums may be substituted for the single tape, each recording medium carrying one or more records and operatively engaged by a corresponding number of reproducing coil assemblies. Thus in the following claims reference to "recording medium" is to be interpreted as including structurally separate tape or wire recording elements.

What I claim and desire to secure by Letters Patent is:

1. In magnetic sound equipment of the character described, an endless recording medium, a pair of rollers to support said recording medium, a plurality of magnetic reproducing heads spaced along said recording medium with the sections of the latter interposed between adjoining heads being of equal length, separate magnetic records carried by said separate sections of said recording medium, means to move said recording medium through said heads, a plurality of electrical controls identified with said records, respectively, and means including a selector switch synchronized with said first-named means to audibly reproduce any of said records in response to the activation of the control identified therewith, respectively, through the reproducing head nearest adjacent the beginning of the record on the medium regardless of the position of said record with respect to the rollers.

2. In magnetic sound equipment of the character described, a recording medium, a plurality of recording heads operatively associated with said recording medium and arranged along the length of the medium in equi-spaced relation, means to move said medium through said heads, an amplifier, the length of said medium between the different pairs of said coils carrying separate magnetic records of sound impulses to be reproduced, a plurality of electrical controls identified with said records respectively, and a selector switch synchronized with said first-named means and actuated in response to activation of any of said controls to connect the reproducing head disposed nearest adjacent the beginning of the record identified with the control activated, with the amplifier.

DE LOY J. WHITE.

REFERENCES CITED

The following references are of record in the file of this patent:

UNITED STATES PATENTS

| Number | Name | Date |
|---|---|---|
| 909,414 | Hytten | Jan. 12, 1909 |
| 1,040,768 | Ryon | Oct. 8, 1912 |
| 1,123,147 | Sherman | Dec. 29, 1914 |
| 1,166,925 | Ober | Jan. 4, 1916 |
| 1,461,528 | Irvine | July 10, 1923 |
| 1,934,320 | Nowosielski | Nov. 7, 1933 |
| 1,968,166 | Pythian | July 31, 1934 |
| 1,990,643 | Fankboner | Feb. 12, 1935 |
| 2,177,481 | Hall | Oct. 24, 1939 |
| 2,209,157 | Glunt | July 23, 1940 |
| 2,258,651 | Hooland | Oct. 14, 1941 |
| 2,269,952 | Morgan | Jan. 13, 1942 |
| 2,317,310 | Stern | Apr. 20, 1943 |
| 2,327,956 | Begun | Aug. 24, 1943 |
| 2,335,277 | Heller | Nov. 30, 1943 |
| 2,349,018 | Tasker | May 16, 1944 |
| 2,356,145 | Begun | Aug. 22, 1944 |